United States Patent
Modalavalasa

(10) Patent No.: US 12,554,845 B2
(45) Date of Patent: Feb. 17, 2026

(54) BOT DETECTION WITH PAGE FINGERPRINTS AND BEHAVIORAL ANALYSIS

(71) Applicant: Akamai Technologies, Inc., Cambridge, MA (US)

(72) Inventor: Venkata Sai Kishore Modalavalasa, Santa Clara, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 47 days.

(21) Appl. No.: 18/679,101

(22) Filed: May 30, 2024

(65) Prior Publication Data
US 2025/0371143 A1    Dec. 4, 2025

(51) Int. Cl.
G06F 21/55    (2013.01)

(52) U.S. Cl.
CPC ...... G06F 21/554 (2013.01); *G06F 2221/034* (2013.01)

(58) Field of Classification Search
CPC .......... G06F 21/554; G06F 2221/034
See application file for complete search history.

(56) References Cited

U.S. PATENT DOCUMENTS

| | | |
|---|---|---|
| 7,958,555 B1 * | 6/2011 | Chen .................. H04L 63/1441 726/25 |
| 9,386,037 B1 | 7/2016 | Hunt et al. |
| 9,578,048 B1 | 2/2017 | Hunt et al. |
| 9,716,726 B2 * | 7/2017 | Pastore ................. H04L 63/061 |
| 9,727,728 B2 | 8/2017 | Avrahami et al. |
| 10,243,981 B2 * | 3/2019 | Zhang ................. H04L 63/1441 |
| 10,587,629 B1 | 3/2020 | Kurupati et al. |
| 10,708,281 B1 | 7/2020 | Modalavalasa et al. |
| 11,245,722 B1 | 2/2022 | Senecal et al. |
| 11,368,483 B1 | 6/2022 | Senecal et al. |
| 11,374,945 B1 | 6/2022 | Senecal et al. |
| 12,101,350 B2 * | 9/2024 | Senecal ............. H04L 63/1433 |
| 2016/0191554 A1 * | 6/2016 | Kaminsky ........... H04L 63/1425 726/23 |
| 2018/0013720 A1 * | 1/2018 | Sachdev ................ G06Q 30/00 |

(Continued)

FOREIGN PATENT DOCUMENTS

| | | | | |
|---|---|---|---|---|
| CN | 106911636 A | * | 6/2017 | ......... H04L 63/1433 |
| CN | 114638984 A | * | 6/2022 | ........... G06F 18/214 |

(Continued)

*Primary Examiner* — Christopher A Revak

(57) ABSTRACT

Improved bot detection systems and methods are disclosed. A page fingerprinting algorithm can be used to categorize web pages. The categorization of web pages enables improved insights in profiling the way a human interacts with a website as opposed to a bot. Learning the patterns of humans and bots for a given web page category (or navigation across categories), a heuristic ruleset and/or machine learning system can differentiate between humans and bots. In this way, a human website visitor can be distinguished from a bot in an improved manner. The teachings hereof include systems and methods for deriving page fingerprints from makeup language files, for categorizing pages based on their structure and associated fingerprints, as well as heuristics and machine learning techniques to characterize website visitor behavior and detect bots, based on such web page categorization and fingerprinting.

19 Claims, 14 Drawing Sheets

(56) References Cited

U.S. PATENT DOCUMENTS

| | | | |
|---|---|---|---|
| 2018/0095941 A1* | 4/2018 | Ciabarra, Jr. | G06F 40/143 |
| 2019/0190950 A1 | 6/2019 | Senecal et al. | |
| 2020/0112578 A1* | 4/2020 | Gupta | H04L 41/142 |
| 2021/0037048 A1 | 2/2021 | Kurupati | |
| 2023/0403300 A1* | 12/2023 | Narayan | H04L 63/20 |

FOREIGN PATENT DOCUMENTS

| | | | | |
|---|---|---|---|---|
| CN | 115225291 A * | 10/2022 | | H04L 67/06 |
| WO | WO-2015120808 A1 * | 8/2015 | | H04L 63/10 |
| WO | WO-2016075577 A1 * | 5/2016 | | H04L 63/1466 |
| WO | WO-2024049148 A1 * | 3/2024 | | H04L 9/40 |

* cited by examiner

BOT DETECTION WITH PAGE FINGERPRINTS AND BEHAVIORAL ANALYSIS

BACKGROUND

Technical Field

This application generally relates to the analysis of website visitors and to the detection of bots.

Brief Description of the Related Art

A variety of techniques are known in the art for detecting and managing bot traffic hitting a website. Known techniques include the analysis of client telemetry, client tracking and device fingerprinting (e.g., based on user agent characteristics and/or TLS attributes). Such data can be built up to conduct behavioral analysis and anomaly detection using machine learning approaches.

Current machine learning techniques, however, struggle to accommodate the ever changing website environment. Likewise, websites are becoming ever more complex: page content and URLs are dynamically changing. Bots are continually evolving, making it difficult to reliably identify them. What is needed are improved methods for understanding a website and how human visitors interact with it as compared to bots.

The teachings hereof enable and leverage the fingerprinting of the layout of a web page. While the fingerprinting of web pages is known in the art, see e.g., U.S. Pat. No. 9,386,037, the contents of which are hereby incorporated by reference, such techniques have been applied to understand the provenance of the web page itself (for example, is the page a phishing attempt or otherwise malicious). In contrast, the application of fingerprinting to understanding web site visitors and bot detection is new.

The teachings hereof enable improved intelligence gathering on the ways in which bots and humans interact with a website. They also enable new systems and methods for automatically identifying bots so that mitigation actions can be taken. The teachings presented herein improve the functioning of a computer system itself, improving the caching function in an individual server as well as that of a larger distributed system having many such servers. Those skilled in the art will understand these and other improvements from the teachings hereof.

BRIEF SUMMARY

This section describes some pertinent aspects of this invention. Those aspects are illustrative, not exhaustive, and they are not a definition of the invention. The claims of any issued patent define the scope of protection.

Improved bot detection systems and methods are disclosed. A page fingerprinting algorithm can be used to categorize web pages. The categorization of web pages enables improved insights in profiling the way a human interacts with a website as opposed to a bot. Learning the patterns of humans and bots for a given web page category (or navigation across categories), a heuristic ruleset and/or machine learning system can differentiate between humans and bots. In this way, a human website visitor can be distinguished from a bot in an improved manner. The teachings hereof include systems and methods for deriving page fingerprints from makeup language files, for categorizing pages based on their structure and associated fingerprints, as well as heuristics and machine learning techniques to characterize website visitor behavior and detect bots, based on such web page categorization and fingerprinting.

Further information about known bot detection methods and systems can be found in the following patent documents: U.S. Pat. No. 11,374,945 issued 2022 Jun. 28, U.S. Pat. No. 11,368,483 issued 2022 Jun. 21, U.S. Pat. No. 11,245,722 issued 2022 Feb. 8, US Patent Publication 20210037048 published 2021 Feb. 4, U.S. Pat. No. 10,708,281 issued 2020 Jul. 7, U.S. Pat. No. 10,587,629 issued 2020 Mar. 10, US Patent Publication 20190190950 published 2019 Jun. 20, the teachings of all of which are incorporated by reference in their entireties.

The claims are incorporated by reference into this section, in their entirety.

BRIEF DESCRIPTION OF THE DRAWINGS

The invention will be more fully understood from the following detailed description taken in conjunction with the accompanying drawings, in which.

Figure 1:
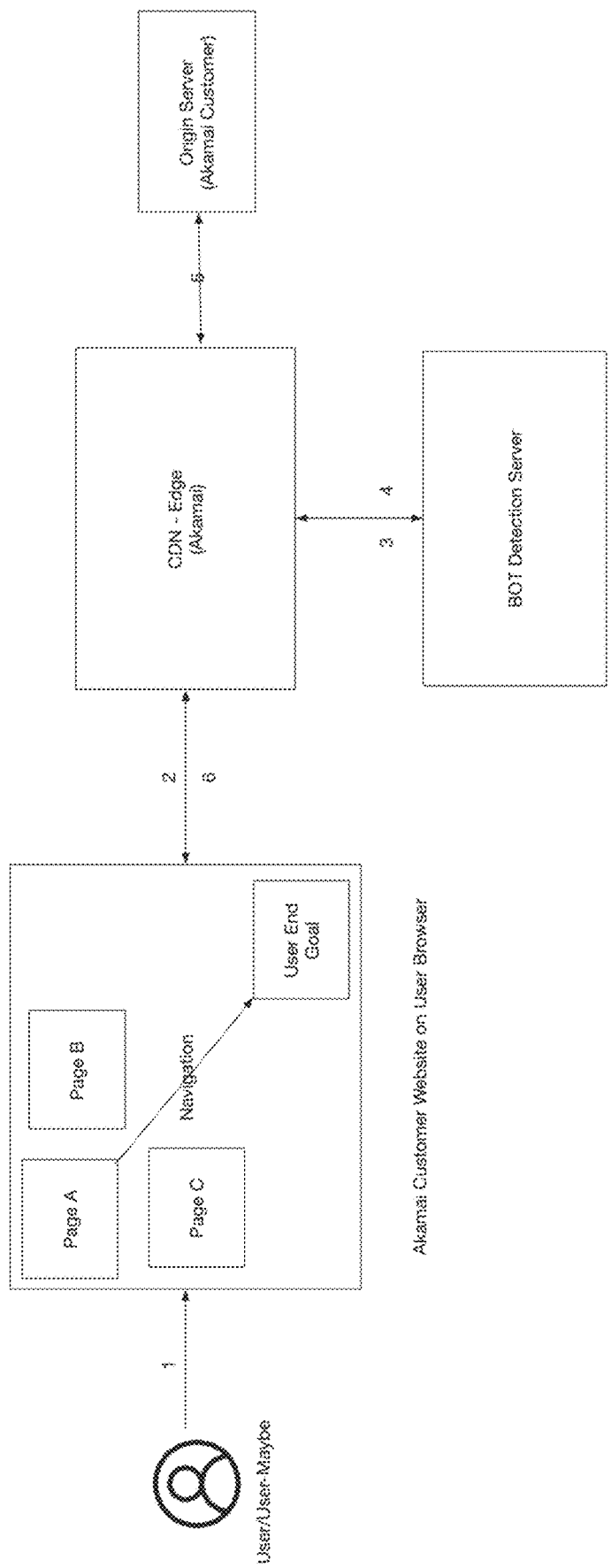
FIG. 1 is a block diagram illustrating a system in accordance with an embodiment of the teachings hereof.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, GraphQL, HTTP versions 1.1 and 2, HTTP over QUIC, MQTT, TCP/IP, and UDP, is assumed. Likewise, basic familiarity with well-known database technologies and terms, such as relational databases (RDBMS), SQL databases and queries, NoSQL databases and/or key-value approaches, is assumed.

All references to HTTP should be interpreted to include an embodiment using encryption (HTTP/S), such as when TLS secured connections are established. While context may indicate the hardware or the software exclusively, should such distinction be appropriate, the teachings hereof can be implemented in any combination of hardware and software. Hardware may be actual or virtualized.

INTRODUCTION

A website may have thousands of dynamic pages and ever changing URLs, especially considering the use of dynamic URLs and query parameters. But the design of a page (layouts) is limited, as typically there is a set of layouts that an origin provides for a given website.

Each layout can be fingerprinted such that it can be uniquely identified, preferably without assistance from the website owner and/or origin server itself. Pages using the same or similar layouts can be grouped together with configurable granularity. User site navigation and other user activity on a given group of pages can be tracked and then algorithms, such as machine learning, can be applied to determine whether such user activity is human or bot-like.

For example, consider two web pages that display products on an e-commerce site. They are not the same pages, and they have different URLs. They may be visually similar in layout and serve a similar function in terms of website browsing. According to the teachings hereof, the two web pages can be categorized as product pages (albeit for different products), and hence have a high similarity score. More specifically, the categorization leverages an ability to identify visually or functionally similar web pages served by an origin server and provide a fingerprint. The identification of page categories can be used, then, as an input to algorithms, including machine learning algorithms, that rely on user site navigation to identify patterns of human or bot users. Such algorithms can be leveraged by solutions to identify and mitigate bots or other undesirable actors on a website. As those skilled in the art will appreciate, assigning traffic to buckets helps a bot managed tool implement self learned detection strategies around user navigation like: most common flows, random flows, fixed flows (cart checkout) and so on—all without needing assistance from the origin.

Many techniques described herein can be thought of as leveraging the insight that there may be only a limited number of categories of pages (from a virtually or functionally similar point of view) that are served on a website. Indeed, pages can be dynamic (content changes for the same URL) but various categories of pages share a set of common page designs/layouts. Analogously, if bots attempt to make URLs look random in their request patterns, e.g., by adding URL parameters that are immaterial to the page category, such "noise" can be eliminated by relying on the fingerprints of pages.

High Level Design Embodiment

FIG. 1 illustrates an example of a bot detection system to which the teachings hereof can be applied. At step 1, there is end user navigation across pages (e.g. via end user client device). At step 2, sensor data (also referred to as telemetry) about user interactions with the webpage is collected and forwarded. At step 3, the bot detection service gathers inputs for decision making. At step 4, human vs. bot scoring occurs and a decision is made as to how to classify the user. The edge server (e.g., an HTTP reverse proxy server) acts on the bot/human scores and forwards the request for handling based thereon, which may be forwarding to origin (shown as step 5) or block the request (step 6), for example. The ultimate decision may be affected by configurable bot management rules and policies.

Figure 2:
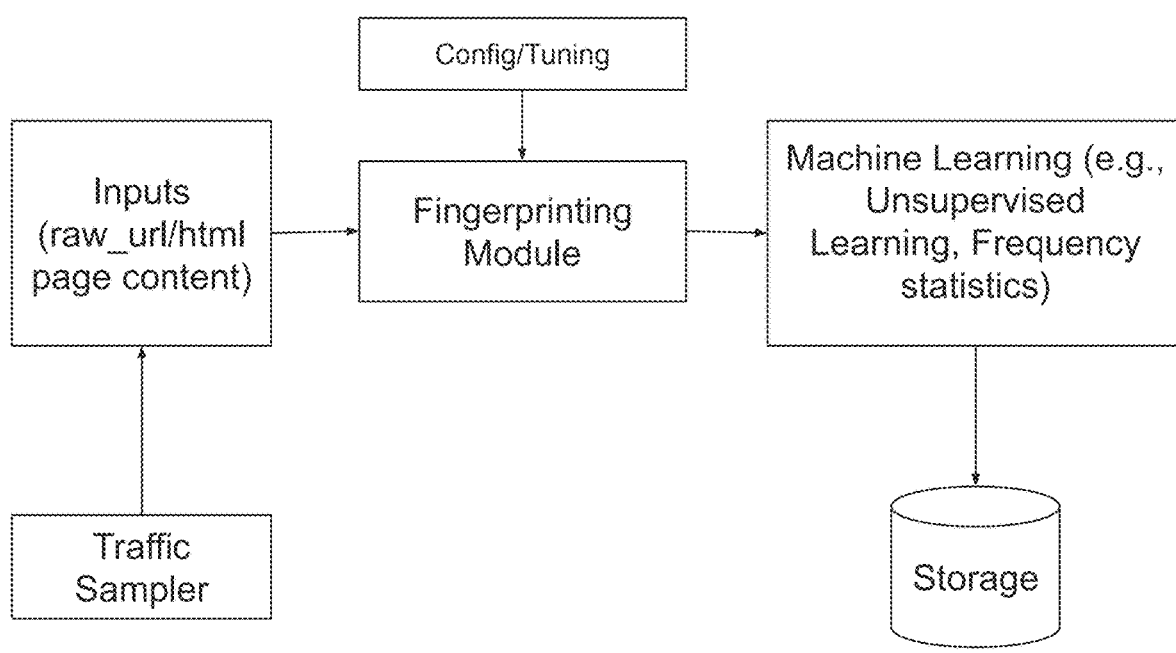
FIG. 2 is a block diagram illustrating a fingerprinting technique in accordance with an embodiment of the teachings hereof.

FIG. 2 illustrates a subsystem for learning about patterns of user activity on web page categories, based on fingerprint classification, in accordance with the teachings hereof. In this example, traffic to a website is sampled and the URL and associated markup language (e.g., HTML) content is extracted. That information is run through a fingerprinting module (more detailed information on that below). The fingerprinting module produces fingerprints for associated URLs and pages. The fingerprints are input to a machine learning algorithm (e.g., an unsupervised learning algorithm) that clusters the fingerprints into categories. URLs and/or fingerprints are then associated with web page categories and this relationship is stored in the Storage.

Fingerprinting Design Embodiment

At a high level, given code for a web page X, compute a one wash hash of its DOM tree after filtering out the dynamic content. Once the "changing" content of a page is filtered, the hash represents a static fingerprint of a page layout. With the right configuration (such as DOM traversal depth+filters (eliminating content)), one can capture the underlying structure of a web page.

Step 0—take a URL as an input.

Step 1—parse the HTML that the URL points to. The page's HTML source is thus extracted as a raw text. This can be done at the edge server or otherwise on the server side (not taken from the browser) to avoid manipulation of page source by browser extensions, end user scripts, bots etc.

Assume for example an HTML full page source includes the following code:

```
<!DOCTYPE HTML>
<html lang="en">
  <head>
    <meta charset="UTF-8"/>
    <script type="text/javascript"></script>
    <link href="#" hreflang="en" rel="alternate"/>
    <meta name="example1" content="example1" />
    <meta name="example2" content="example1" />
  </head>
  <body>
    <div class="outer-container">
      <div class="inner-container">
        <section class="content-container">
          <div class="content">
            <p>Content</p>
            <p>Content</p>
            <p>Content</p>
            <p>Content</p>
          </div>
          <section class="ads">
            <div class="ad1">ad with its own DOM tree</div>
              <div class="ad2">ad with its own DOM tree</div>
          </section>
        </section>
        <section class="sidebar-container">
          <div class="sidebar-content">
             <div>Content</div>
             <div>Content</div>
             <div>Content</div>
          </div>
          <section class="ads">ad with its own DOM tree</section>
          <div class="someother-container">dynamic content with its own DOM tree</div>
        </section>
      </div>
    </div>
    <footer>
      <div id="footer-left">
        <p class="copyright">Copyright Message</p>
        <span class=""></span>
      </div>
      <div id="footer-right">
        <p class="terms">Terms and Conditions</p>
        <span class=""></span>
      </div>
    </footer>
  </body>
```

Figure 3:
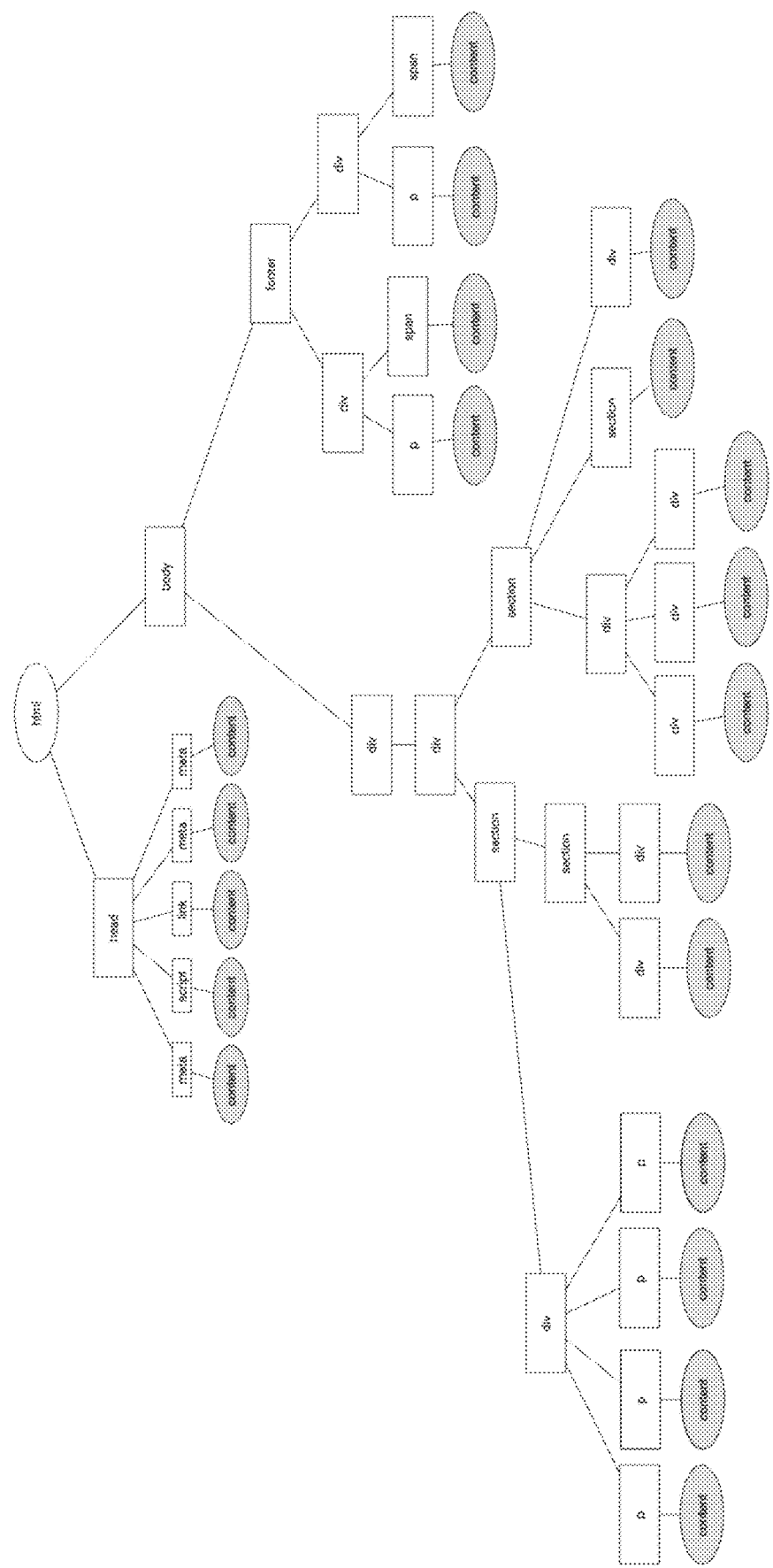
FIG. 3 is a diagram illustrating a DOM tree created from the markup language of a web page.

Processing this HTML produces a DOM tree such as is shown in FIG. 3. That is the DOM tree of the full page source, including content.

Step 2—Filter content from the DOM tree. This means that content nodes are removed. The foregoing HTML thus looks like the following

```
<!DOCTYPE html>
<html lang="en">
  <head>
    <meta charset="UTF-8" />
    <script type="text/javascript"></script>
    <link href="#" hreflang="en" rel="alternate" />
    <meta name="example1" content="example1" />
    <meta name="example2" content="example1" />
  </head>
  <body>
    <div class="outer-container">
      <div class="inner-container">
        <section class="content-container">
          <div class="content">
            <p></p>
            <p></p>
            <p></p>
            <p></p>
          </div>
          <section class="ads">
            <div class="ad1"></div>
            <div class="ad2"></div>
          </section>
        </section>
        <section class="sidebar-container">
          <div class="sidebar-content">
             <div></div>
             <div></div>
             <div></div>
          </div>
          <section class="ads"></section>
          <div class="someother-container"></div>
        </section>
      </div>
    </div>
    <footer>
      <div id="footer-left">
        <p class="copyright"></p>
        <span class="text"></span>
      </div>
      <div id="footer-right">
        <p class="terms"></p>
        <span class="text"></span>
      </div>
    </footer>
  </body>
</html>
```

Figure 4:
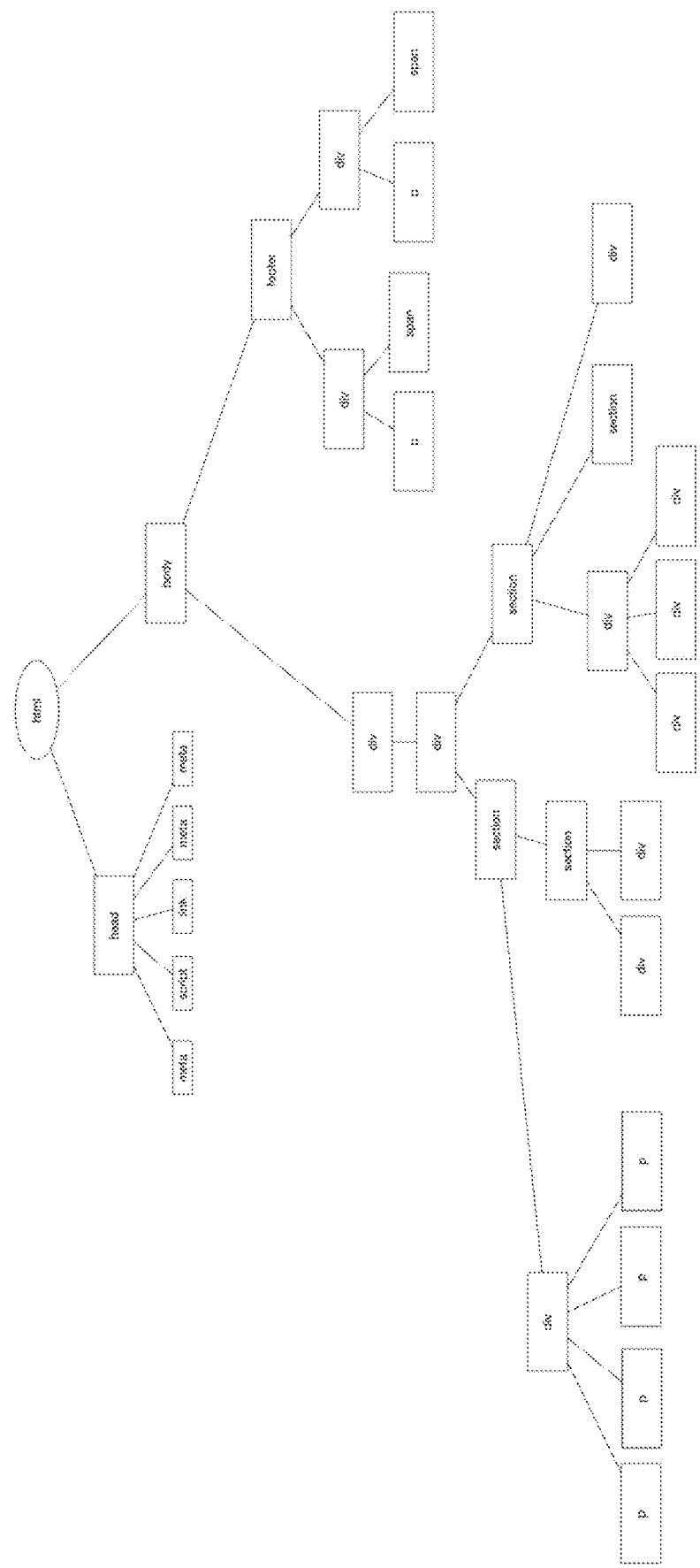
FIG. 4 is a diagram illustrating the DOM tree of FIG. 3 with content filtered out of the tree.
Figure 5:
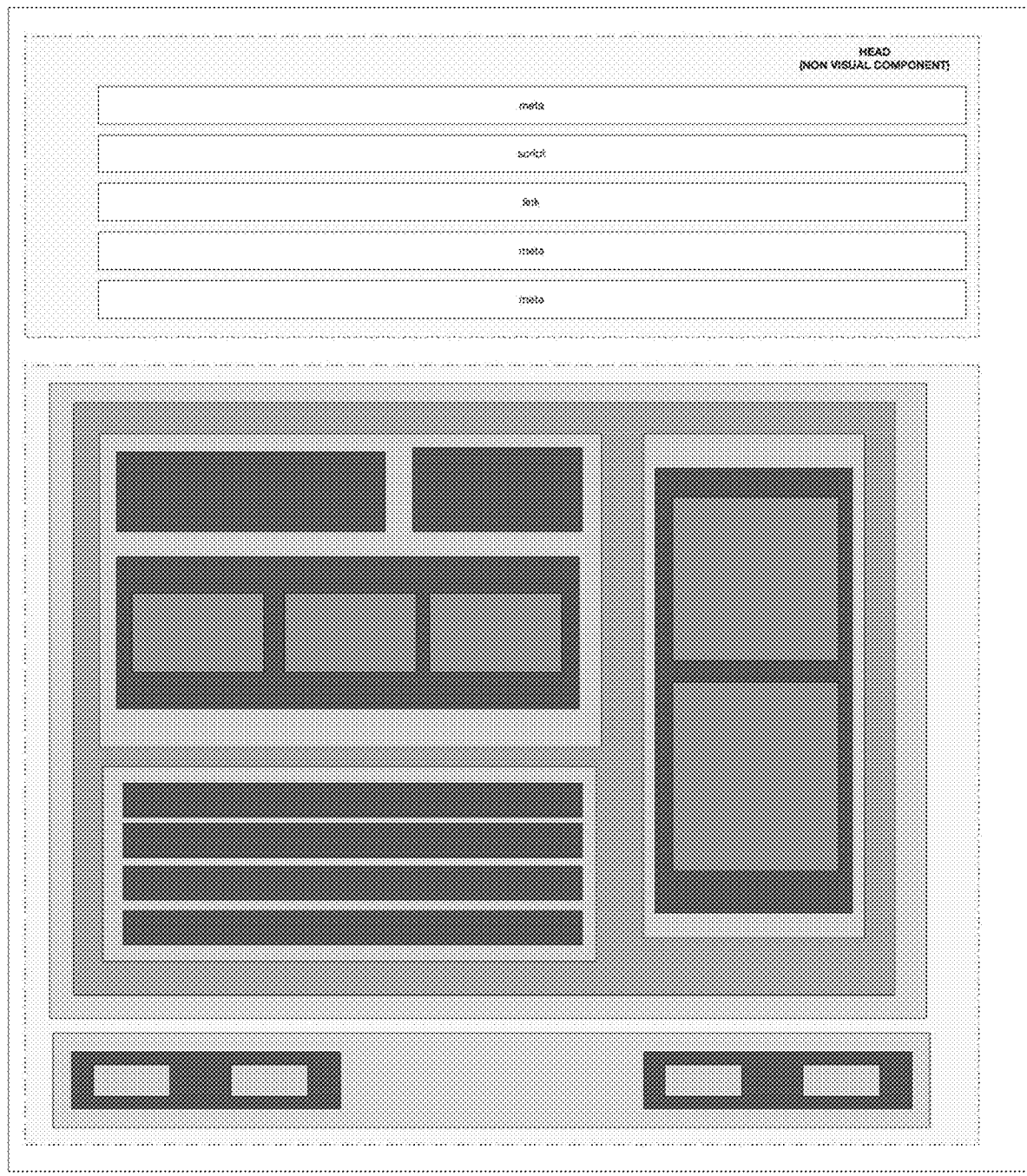
FIG. 5 is an illustration of the layout of a web page as it corresponds to a filtered DOM tree such as that shown in FIG. 4.

The DOM tree with content removed looks as shown in FIG. 4. A visual representation of the sample page DOM is shown in FIG. 5.

Step 3—DOM tree with desired depth is constructed. This means that the DOM tree can be filtered to a configurable depth before processing the DOM tree data to produce a fingerprint. The DOM tree depth (also referred to as the DOM traversal depth N) controls the breadth of a given layout category on a website. The fewer layers that are included, the broader the categories of web pages that will match the same layout fingerprint. Put another way, a set of pages belonging to a web page category share an identical underlying structure down to the traversal depth N. The value of N determines the number of categories of distinct layouts that a web page could fall into.

Figure 6:
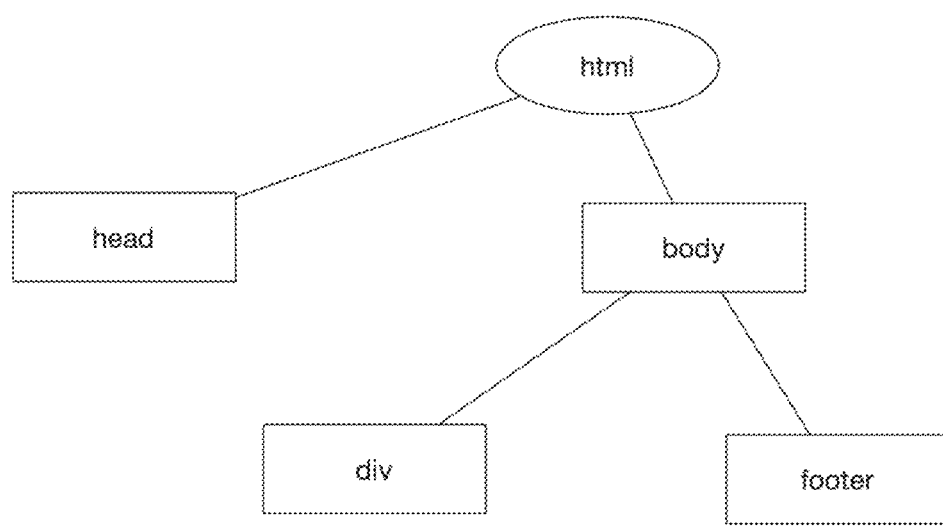
FIG. 6 is an illustration of a DOM tree filtered to a configured depth, in accordance with an embodiment of the teachings hereof.

For example, with a depth of N=1, the number of web page layout categories will be small, and many pages will be scored similarly. This may be too generic as most pages are grouped together. FIG. 6 illustrates a DOM tree filtered to a depth of N=1.

Figure 7:
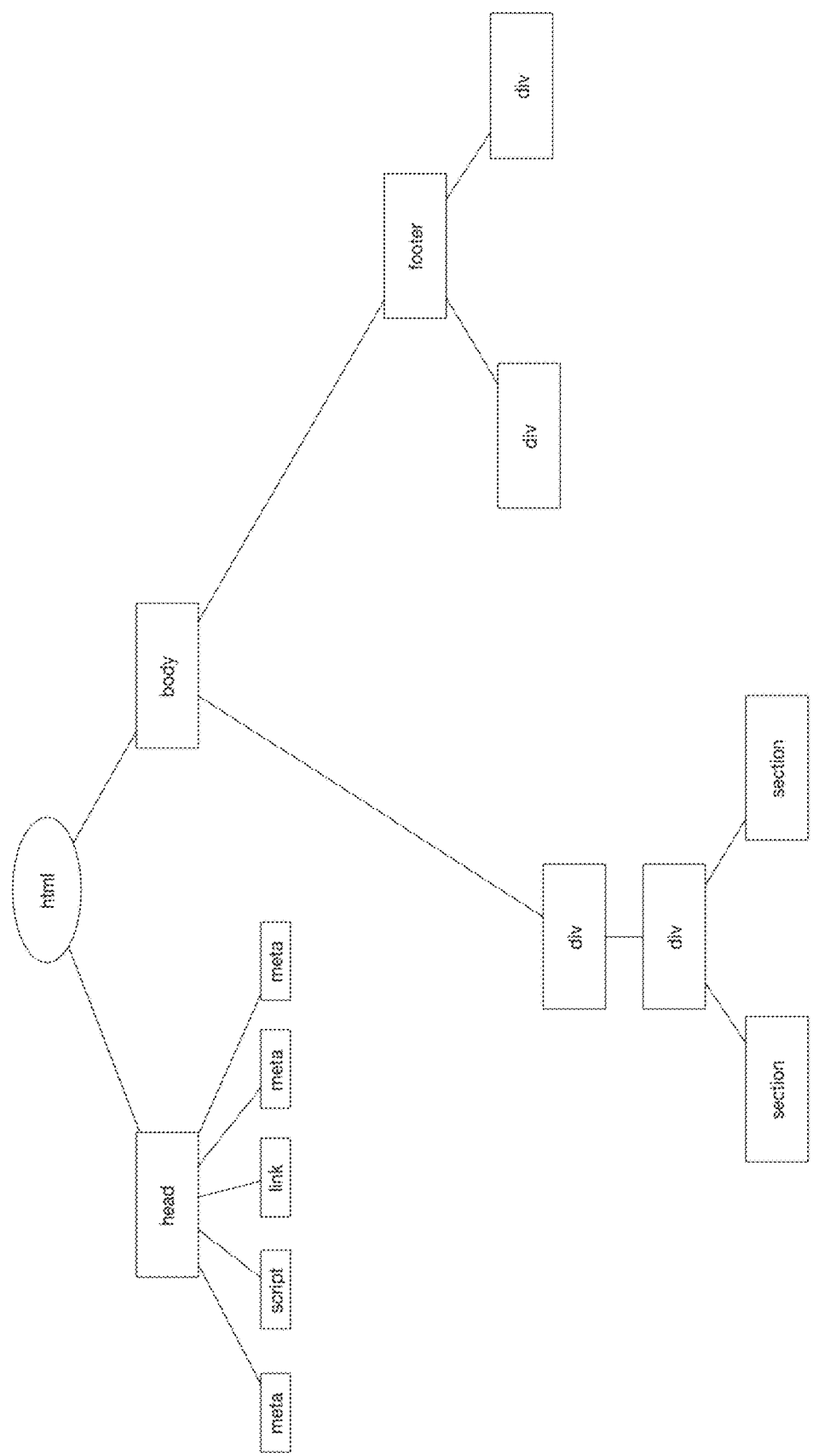
FIG. 7 is an illustration of a DOM tree filtered to a greater configured depth, in accordance with an embodiment of the teachings hereof.

With a depth of N=2, some categorization may take place; with N=3, more distinct categories are formed. FIG. 7 illustrates a DOM tree filtered to a depth of N=3.

Figure 8:
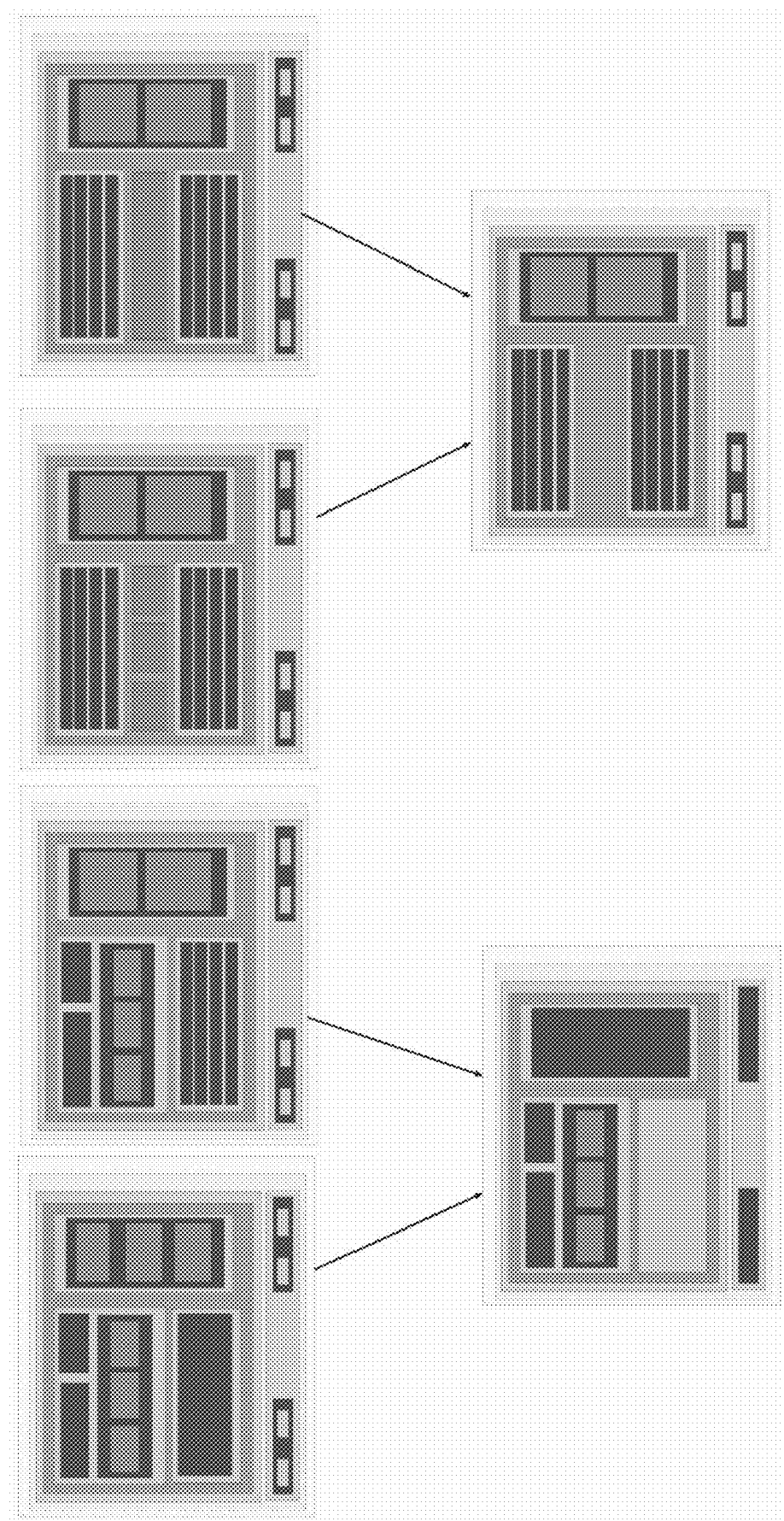
FIG. 8 is an illustration of the layout of a web page filtered as shown in FIG. 7 to create different categories of layouts.

At some value N=k, the web pages are categorized into a useful set of things like product, checkout, home, blog posts, FAQ, and the like. At a depth of N=k, visually similar pages are categorized together yet they are distinguished from other pages. Preferably, depths are parametrized and can be individually tunable at various levels of the DOM tree. FIG. 8 illustrates a DOM tree with depth of N=k, such that product pages are grouped together into one category (left) and blog posts are grouped together into another category (right). Preferably, variations within a category like ads, dynamic content etc are neutralized by appropriate traversal depth/content filtering.

One strategy for choosing the depth N is to manually configure this value. For example, a customer can provide details about the website layout and configure filters to exclude content that varies between pages and thus tunes the 'N' value.

The table below illustrates possible filter rules:

| Filter Category | Purpose | Example values |
|---|---|---|
| DOM Tree Sections | Each section in this category produces a fingerprint. We can exclude certain sections altogether for a wider categorization. | whole page, head, body |
| Skip HTML Elements by identifiers | Page elements with these ids and classes are removed from DOM tree | class = ad* id = product-description-div |
| Skip HTML Elements | Exclude all matching tags by this type | p: <p> . . . </p> <span>: <span> . . . </span> |
| Regex | Regular expressions can be crafted for advanced filtering of unwanted sections/elements. | <article[^>]*\bid="user_[a-zA-Z0-9]*"[^>]*>.*?</article> |

By tuning above parameters, one can capture the underlying structure of the page that is constant across other pages that belong to the same category.

Another strategy is to automatically tune the 'N' value using machine learning and statistical approaches. For example, an algorithm picks a traversal level that yields the largest number of categories for a given set of pages.

The value of k varies across websites and the teachings hereof are not dependent on the use of any one value, which can vary across implementations. An optimal depth (varies with website) can be chosen based on the website characteristics to maximize the categories and minimize noise.

If N is increased too high, too many child nodes are included in the DOM tree and the resulting fingerprint can become very specific to pages, with the number of categories expanding.

Step 4—Process DOM tree with applied filters to generate a fingerprint. In a preferred embodiment, the fingerprint is generated by applying a hash function (e.g., a one way hash such as SHA-256) to the filtered DOM tree. This is but an example—a wide variety of techniques to map a DOM tree to a unique or semi-unique value can be used.

The table below illustrates step 4.

| Page URL | Flattened DOM Tree - underlying structure | SHA-256 Fingerprints | Category |
|---|---|---|---|
| http://example.com/product/page1 | <html><head><meta/><script></script><link/><meta/><meta/></head><body><div><div><section><div><p></p><p></p><p></p><p></p><p></p></div><section><div><div></section></section><section><div><div></div><div></div><div></div></div><section><div></section></div></div><footer><div><p><span></div><div><p><span></div></footer></body></html> | { "full_page": "f4299c562f9d0004f3d810eb25c45e9e2e95c2977b22e53acba8cf5f2e8600bd", "section_head": "1b786e4686b85c02a01a0239423aa81391db078ddfde73b225f63acdf508646c", "section_body" : "1973ffb3d2ee8703315785e2511677c13168e80afe6a19af4848a623ead9f9fc", "section_custom": "64e6fdc5bb6ea975c56aa3057c3ed29cda1b383b892343568107c543aea7f881" } | Product |
| http://example.com/product/page2?source=ads&tracking=id | <html><head><meta/><script></script><link/><meta/><meta/></head><body><div><div><section><div><p></p><p></p><p></p><p></p><p></p></div><section><div><div></section></section><section><div><div></div><div></div><div></div></div><section><div></section></div></div><footer><div><p><span></div><div><p><span></div></footer></body></html> | { "full_page": "f4299c562f9d0004f3d810eb25c45e9e2e95c2977b22e53acba8cf5f2e8600bd", "section_head": "1b786e4686b85c02a01a0239423aa81391db078ddfde73b225f63acdf508646c", "section_body" : "1973ffb3d2ee8703315785e2511677c13168e80afe6a19af4848a623ead9f9fc", "section_custom": "64e6fdc5bb6ea975c56aa3057c3ed29cda1b383b892343568107c543aea7f881" } | Product |
| . . . several rows . . . | . . . several rows . . . | . . . several rows . . . | . . . several rows . . . |
| . . . several rows . . . | . . . several rows . . . | . . . several rows . . . | . . . several rows . . . |
| http://example.com/blog/post1 | <html><head><meta/><script></script><link/><meta/><meta/></head><body><div><div><section><div><div></div><div></div><div></div><div></div><div></div></div><section><div><div></section></section><section | { "full_page": "75c66dc29d70a3285b0bfa1b9d682df19bc169995127a65273f97acc456fd9ec", "section_head": "1b786e4686b85c02a01a0239423aa81391db078ddfde73b225f63acdf508646c", "section_body" : | Blog Post |

| Page URL | Flattened DOM Tree - underlying structure | SHA-256 Fingerprints | Category |
|---|---|---|---|
| | n><div><div></div><div></div><div></div><div></div><div></div><div></div><div></div><div></div><di v><section><div></section></div></div><footer><div></div></footer></body></html> | "7835c49506c32c754e9e5dfd550b96b96 626247e99efeb106bb150d8fb68459f", "section_custom": "6ae464dc315acffb84e6b88e52c5b2620 c5b0b0ab51b5b2d5bb3d17c6cb7c15f" } | |
| http://example .com/blog/pos t1?category=c at1&date=date 1 | <html><head><meta/><script></script><link/><meta/><meta/></head><body><div><div><section><div><div></div><div></div><div></div><div></div><div></div><div></div><div></div></div><section><div><div></section></section><section><div><div></div><div></div><div></div><div></div><div></div><div></div><div></di v><section><div></section></div></div><footer><div></div></footer></body></html> | { "full_page": "75c66dc29d70a3285b0bfa1b9d682df19 bc169995127a65273f97acc456fd9ec", "section_head": "1b786e4686b85c02a01a0239423aa813 91db078ddfde73b225f63acdf508646c", "section_body" : "7835c49506c32c754e9e5dfd550b96b96 626247e99efeb106bb150d8fb68459f", "section_custom": "6ae464dc315acffb84e6b88e52c5b2620 c5b0b0ab51b5b2d5bb3d17c6cb7c15f" } | Blog Post |

In some embodiments, a given page is associated with multiple fingerprints—one of the head DOM, one for the title of the page, and another for the body DOM.

Using the above techniques, several different URLs, the head DOM fingerprint and body DOM fingerprint can be the same on similar pages, such as a help page. Even with randomized URLs that contain random strings in the path and/or query parameters, the underlying structure will still be fingerprinted into a given category and able to be grouped with other pages. Furthermore, URLs that are simply fabricated by a bot (junk URLs) can be put into a single category.

Bot Detection

A variety of methods and systems are now described for applying the fingerprinting and web page categorization insights to bot detection.

Once a page is fingerprinted, a database of page URLs and associated fingerprints with traffic statistics is constructed. This will be the basis for several algorithms that follow.

Here is a table that is an example of a fingerprint to category mapping. Labeling can be manually performed or learned:

| Fingerprint | Category Label |
|---|---|
| f4299c562f9d0004f3d810eb25c45e9e2e95c2977b22e53acba8cf5f2e8600bd | Product |
| c0cc0f30f752bd1466c7175b555341591ec519be648d2c9c361e80a78e301fab | Home |
| 0d5c2318b2f0675ab16292daa558abdd818d4dc93eeab401dc8a9e9303551cc9 | Help Pages |
| . . . several rows . . . | . . . several rows . . . |
| . . . several rows . . . | . . . several rows . . . |
| fc1be64be098f43d101fc368752643a004531552e4036cf9b051e6dce72ff0a5 | 404 Pages |
| 4fd547778f4a0173ba84aa956273f734627e01ea53d8fcd4ab0ead42121ca20a | 5XX Pages |

The following is an example of a fingerprint table and the percentage of traffic associated with them. This can be built from a given customer (domain) traffic seen on a content delivery network.

| Fingerprint | Traffic Rates |
|---|---|
| f4299c562f9d0004f3d810eb25c45e9e2e95c2977b22e53acba8cf5f2e8600bd | 30% |
| c0cc0f30f752bd1466c7175b555341591ec519be648d2c9c361e80a78e301fab | 45% |
| 0d5c2318b2f0675ab16292daa558abdd818d4dc93eeab401dc8a9e9303551cc9 | 10% |
| . . . several rows . . . | . . . several rows . . . |
| . . . several rows . . . | . . . several rows . . . |
| fc1be64be098f43d101fc368752643a004531552e4036cf9b051e6dce72ff0a5 | 3% |
| 4fd547778f4a0173ba84aa956273f734627e01ea53d8fcd4ab0ead42121ca20a | 2% |

The following is an example of a table that might be maintained as an in-memory mapping of URLs to fingerprints. Such a table can be stored in a cache of a bot detection system.

| Page URL | Computed Fingerprint | Matching Category |
|---|---|---|
| http://example.com/product/product1 | f4299c562f9d0004f3d810eb25c45e9e2e95c2977b22e53acba8cf5f2e8600bd | Product |
| http://example.com/product/product1?source=s&utm=tracker1&referer=a | f4299c562f9d0004f3d810eb25c45e9e2e95c2977b22e53acba8cf5f2e8600bd | Product |
| http://example.com/product/product1?source=y&utm=tracker1&referer=b | f4299c562f9d0004f3d810eb25c45e9e2e95c2977b22e53acba8cf5f2e8600bd | Product |
| . . . several rows . . . | . . . several rows . . . | . . . several rows . . . |
| . . . several rows . . . | . . . several rows . . . | . . . several rows . . . |
| . . . several rows . . . | . . . several rows . . . | . . . several rows . . . |
| http://example.com/newdesign/product1?source=new | 0d5c2318b2f0675ab16292daa558abdd818d4dc93eeab401dc8a9e9303551cc9 | New Page (add to processing queue) |
| http://example.com/help/shipping | 0d5c2318b2f0675ab16292daa558abdd818d4dc93eeab401dc8a9e9303551cc9 | Help |
| http://example.com/help/tandc | 0d5c2318b2f0675ab16292daa558abdd818d4dc93eeab401dc8a9e9303551cc9 | Help |

Figure 9:
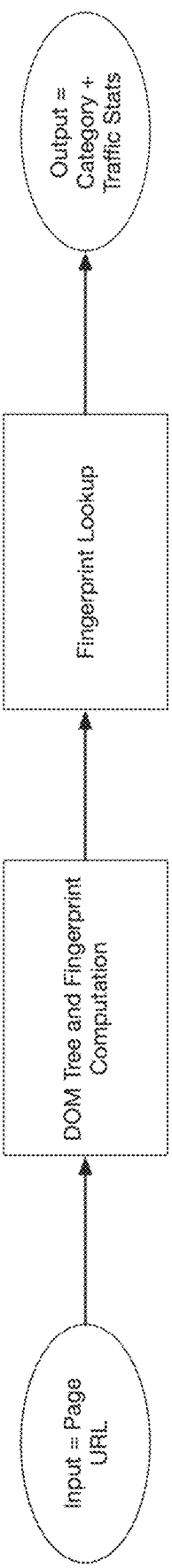
FIG. 9 is a flow diagram for lookup of fingerprints, in accordance with an embodiment of the teachings hereof.

Once such tables are established, then when a client requests a given URL, the flow shown in FIG. 9 can be performed. The input is the URL of the web page that points to the markup language document. If necessary, DOM tree and fingerprint can be calculated for this markup language document. Of course, if the URL matches to a previously seen URL, then the fingerprint can be looked up straight away in a URL to fingerprint table. Put another way, the system can maintain a database of popular pages and associated fingerprints to save on compute (cache). However, an exhaustive list of such mapping may be impractical, considering thousands of variations and ever changing URLs of pages. Bots are not constrained to use a fixed set of URLs and can vary them to refresh cookies/sessions etc. Therefore it is advantageous to maintain a "category mapping of known fingerprints" and associated traffic statistics.

Bot Detection: Machine Learning and Automated Clustering

Figure 10:
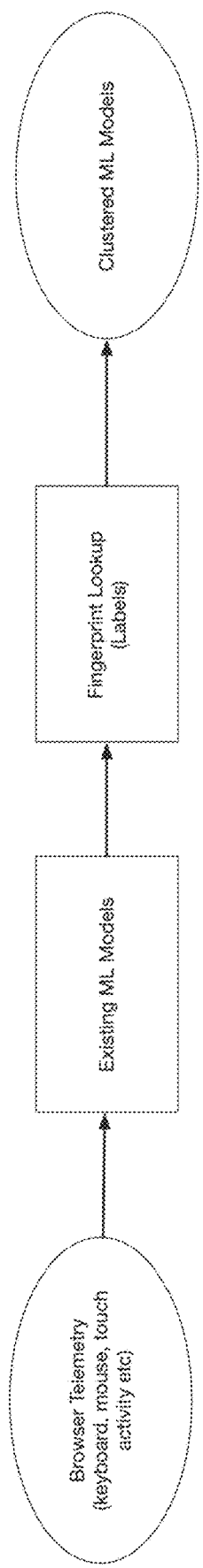
FIG. 10 is an illustration of clustering the decisions of machine learning models when supplemented by fingerprint data, in accordance with an embodiment of the teachings hereof.

FIG. 10 illustrates a method for automatically refining existing machine learning models using the web page categorization from fingerprinting. More specifically, existing machine learning models are trained on telemetry data to distinguish between human users and bots. Those trained models can be supplemented with fingerprint data (e.g., a label corresponding to web page category). Doing so enables the decisions of the machine learning models to be clustered in accord with those labels, which are then analyzed to determine commonality in characteristics and/or otherwise to generate attack signatures specific to a category of web pages.

Bot Detection: User Activity Heatmap on Known Pages

In this approach, the web page categorization/fingerprint is associated with heatmap data derived from telemetry and machine learning models. The patterns of behavior are thus analyzed, and anomaly detection performed, with reference to the category of web page that a user agent is visiting.

The first step is to collect telemetry data from the client, as known in the art. Telemetry collected can include: browser activity (pages visited), Mouse events, Keyboard events, Touch events, Scroll events and so on, for a given web page.

The following table provides an example of the kind of events that can be collected:

| Telemetry | Event format | Sample Events |
|---|---|---|
| Mouse Events | {<br>"ts" : "event_timestamp",<br>"id": "event_id",<br>"x": "x_pos",<br>"y": "y_pos"<br>} | [{"ts":"1710701188733","id":"0","x":"110","y":"120"},{"ts":"1710701188735","id":"1","x":"111","y":"121"},{"ts":"17107011887366","id":"2","x":"110","y":"120"},{"ts":"1710701188737","id":"0","x":"110","y":"125"},{"ts":"1710701188739","id":"0","x":"113","y":"123"},{"ts":"1710701188739","id":"0","x":"116","y":"145"},{"ts":"1710701188740","id":"0","x":"115","y":"142"} . . . several events . . . {"ts":"1710701188741","id":"0","x":"117","y":"120"},{"ts":"1710701188741","id":"0","x":"113","y":"189"},{"ts":"1710701188741","id":"0","x":"111","y":"141"},{"ts":"1710701188742","id":"0","x":"121","y":"120"},{"ts":"1710701188743","id":"0","x":"111","y":"120"},{"ts":"1710701188745","id":"0","x":"110","y":"125"},{"ts":"1710701188747","id":"0","x":"111","y":"120"}] |
| Touch Events | {<br>"ts" : "event_timestamp",<br>"id": "event_id",<br>"x": "x_pos",<br>"y": "y_pos"<br>} | [{"ts":"1710701188733","id":"0","x":"110","y":"120"},{"ts":"1710701188735","id":"1","x":"111","y":"121"},{"ts":"17107011887366","id":"2","x":"110","y":"120"},{"ts":"1710701188737","id":"0","x":"110","y":"125"},{"ts":"1710701188739","id":"0","x":"113","y":"123"},{"ts":"1710701188739","id":"0","x":"116","y":"145"},{"ts":"1710701188740","id":"0","x":"115","y":"142"} . . . several |

-continued

| Telemetry | Event format | Sample Events |
|---|---|---|
| Scroll Events | {<br>  "ts" : "event_timestamp",<br>  "id": "event_id",<br>  "x": "x_pos",<br>  "y": "y_pos"<br>} | events . . . {"ts":"1710701188741","id":"0","x":"117","y":"120"},{"ts":"17107011 88741","id":"0","x":"113","y":"189"},{"ts":"1710701188741","id":"0","x":"111","y":"141"},{"ts":"1710701188742","id":"0","x":"12 1","y":"120"},{"ts":"1710701188743","id":"0","x":"111","y":"120 "},{"ts":"1710701188745","id":"0","x":"110","y":"125"},{"ts":"17 10701188747","id":"0","x":"111","y":"120"}]<br>[{"ts":"1710701188733","id":"0","x":"110","y":"120"},{"ts":"171 0701188735","id":"1","x":"111","y":"121"},{"ts":"171070118873 6","id":"2","x":"110","y":"120"},{"ts":"1710701188737","id":"0","x":"110","y":"125"},{"ts":"1710701188739","id":"0","x":"113","y":"123"},{"ts":"1710701188739","id":"0","x":"116","y":"145"},{"ts":"1710701188740","id":"0","x":"115","y":"142"} . . . seve ral events . . . {"ts":"1710701188741","id":"0","x":"117","y":"120"},{"ts":"171070118 8741","id":"0","x":"113","y":"189"},{"ts":"1710701188741","id":"0","x":"111","y":"141"},{"ts":"1710701188742","id":"0","x":"12 1","y":"120"},{"ts":"1710701188743","id":"0","x":"111","y":"120 "},{"ts":"1710701188745","id":"0","x":"110","y":"125"},{"ts":"17 10701188747","id":"0","x":"111","y":"120"}] |

In the above example the events are processed to generate a heat map of user activity showing, e.g., user mouse activity concentrated near the "Add to cart" button on a product page. A variety of such heat maps can be obtained for a given website.

Figure 11:
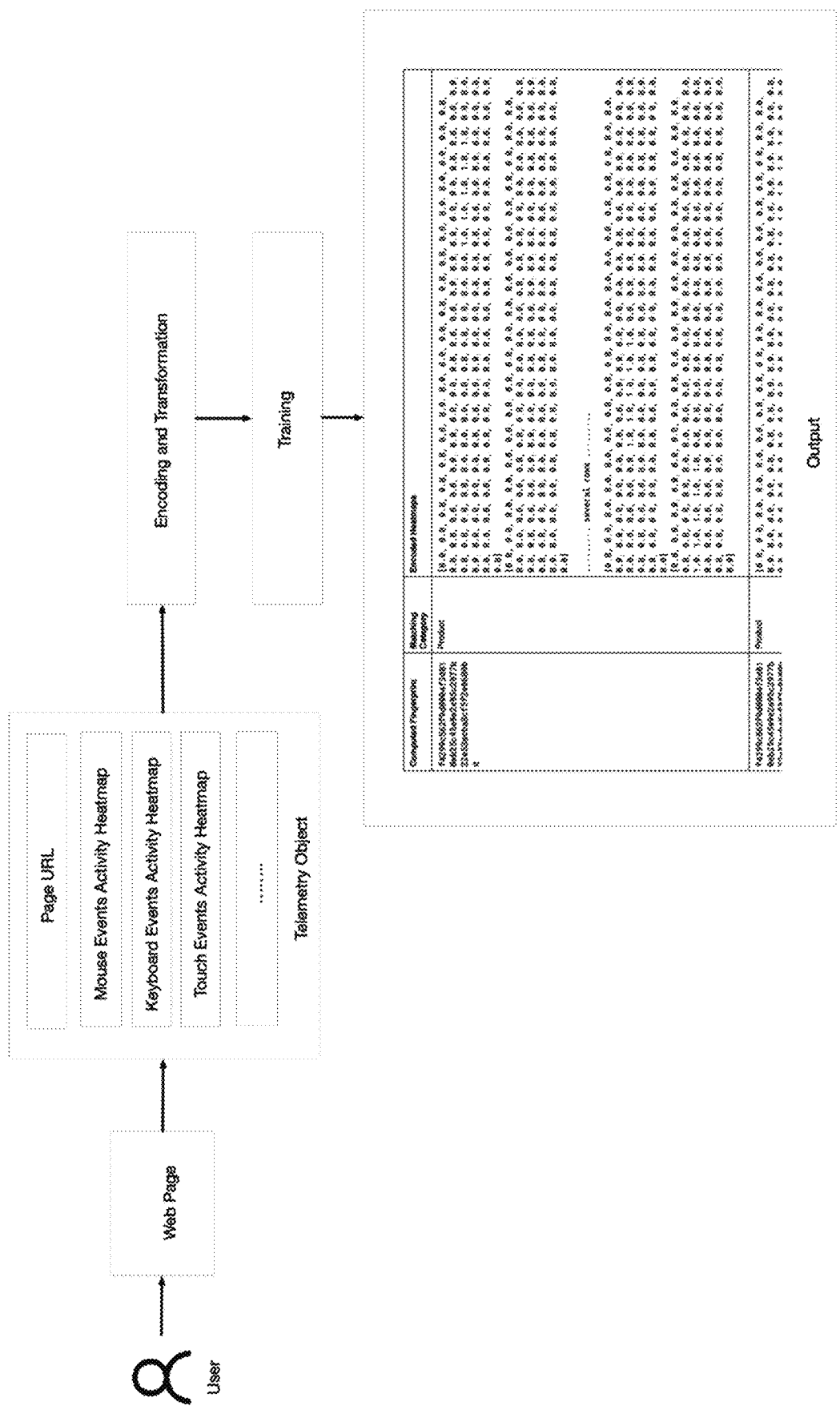
FIG. 11 is a diagram illustrating the training of a machine learning algorithm with heatmap data and associated web pages with fingerprints, in accordance with an embodiment of the teachings hereof.

Next, and as shown in FIG. 11, a machine learning algorithm can be trained with the heatmaps and the web page they came from (with fingerprint) to learn how to classify (cluster) heat maps into web page categories. As a result, we have an association between a web page category (fingerprint) and a "normal" or expected heat map from users. This information can be placed into a table for algorithmic lookup by page URL and fingerprint, as illustrated by the example table below.

| Computed Fingerprint | Page Category | Encoded Heatmaps |
|---|---|---|
| f4299c562f9d000 4f3d810eb25c45e 9e2e95c2977b22 e53acba8cf5f2e8 600bd | Product | [0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 1.0, 1.0, 1.0, 1.0, 1.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0]<br>. . . several rows. . . |
| f4299c562f9d000 4f3d810eb25c45e 9e2e95c2977b22 e53acba8cf5f2e8 600bd | Product | [0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 1.0, 1.0, 1.0, 1.0, 1.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0]<br>. . . several rows . . . |
| f4299c562f9d000 4f3d810eb25c45e 9e2e95c2977b22 e53acba8cf5f2e8 600bd | Product | [0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 1.0, 1.0, 1.0, 1.0, 1.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0]<br>. . . several rows . . . |
| . . . several rows . . . | . . . several rows . . . | . . . several rows . . . |
| . . . several rows . . . | . . . several rows . . . | . . . several rows . . . |
| . . . several rows . . . | . . . several rows . . . | . . . several rows . . . |
| 0d5c2318b2f067 5ab16292daa558 abdd818d4dc93e eab401dc8a9e93 03551cc9 | Product v2 | [0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0]<br>. . . several rows . . . |
| 0d5c2318b2f067 5ab16292daa558 abdd818d4dc93e eab401dc8a9e93 03551cc9 | Help | [0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0]<br>. . . several rows . . . |

| Computed Fingerprint | Page Category | Encoded Heatmaps |
|---|---|---|
| 0d5c2318b2f067 5ab16292daa558 abdd818d4dc93e eab401dc8a9e93 03551cc9 | Help | [0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 1.0, 1.0, 1.0, 1.0, 1.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0] . . . several rows . . . |

Figure 12:
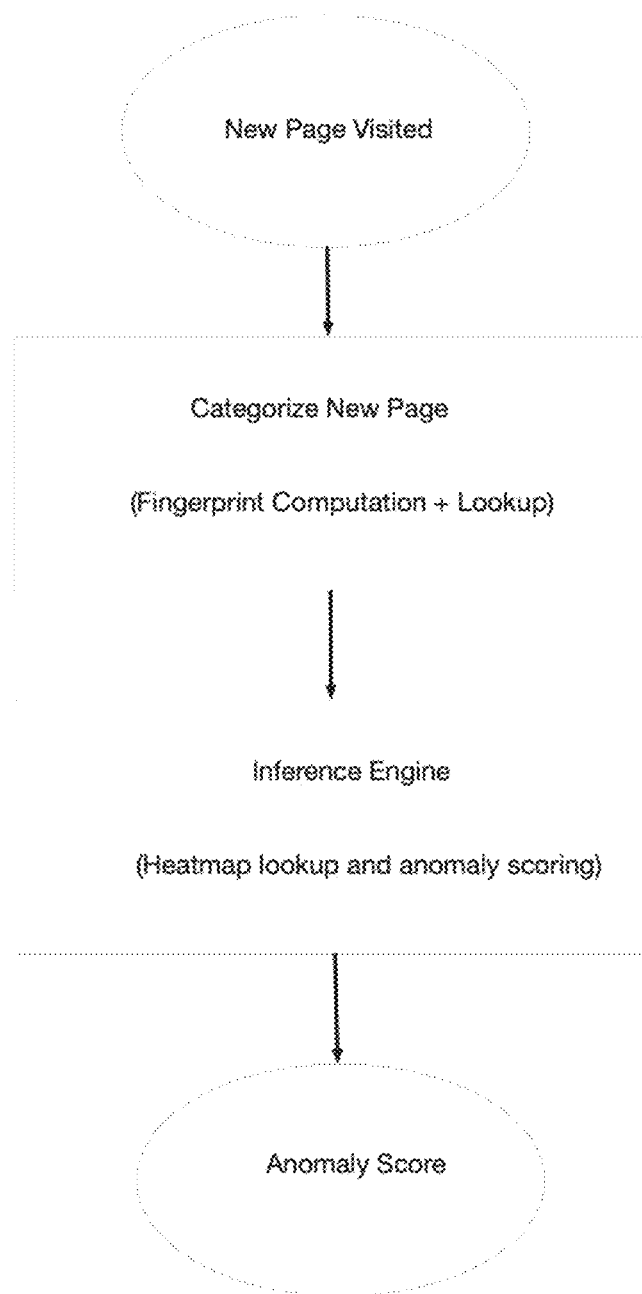
FIG. 12 is a diagram illustrating the online, synchronous application of the trained machine learning model that was depicted in FIG. 11, in accordance with an embodiment of the teachings hereof.

The encoded heat maps can then be used online as shown in FIG. 12. When a new page request arrives at the server, it is categorized by determining its fingerprint (computation based on filtered DOM, or possibly lookup from cache). Telemetry is collected from the client to produce a heatmap. The fingerprint and the heatmap is applied to the inference engine to produce an anomaly score. An example of scoring is shown in the table below.

| New Page Visit URL | Computed Fingerprint | Page Category | Heatmap Score (incoming request compared to ML model of a group) | Inference |
|---|---|---|---|---|
| http://example.com/product/abc?x=y&z=a | f4299c562f9d0004f3d810eb2 5c45e9e2e95c2977b22e53acb a8cf5f2e8600bd | Product | 0.99 | Human-Like |
| http://example.com/product/abc?x=y&z=a | f4299c562f9d0004f3d810eb2 5c45e9e2e95c2977b22e53acb a8cf5f2e8600bd | Product | 0.95 | Human-Like |
| http://example.com/product/random | f4299c562f9d0004f3d810eb2 5c45e9e2e95c2977b22e53acb a8cf5f2e8600bd | Product | 0.39 | Bot-Like |
| http://example.com/product/abc?x=y&z=a | f4299c562f9d0004f3d810eb2 5c45e9e2e95c2977b22e53acb a8cf5f2e8600bd | Product | 0.19 | Bot-Like |

Bot Detection: User Site Navigation Heuristics

In this approach, the navigation flows of clients are analyzed to determine a ground truth of "normal" or expected behavior. This analysis is done with reference to web page categorization. Then, anomalous behavior for a given web site category can be detected.

For example, consider the following example table showing frequently seen transaction flows on a website.

| Popular Transaction Flows (with reference to fingerprints) | Translation | % of traffic |
|---|---|---|
| F4299c562 → F4299c562 → F4299c562 → B4297c574 | Product Page → Product Page → Product Page → Checkout | 35% |
| 6211712 → F4299c562 → F4299c562 → B4297c574 | Home Page → Product Page → Product Page → Checkout | 20% |
| . . . more rows . . . | . . . more rows . . . | . . . more rows . . . |
| . . . more rows . . . | . . . more rows . . . | . . . more rows . . . |
| . . . more rows . . . | . . . more rows . . . | . . . more rows . . . |
| a0571587 → F4299c562 → B4297c574 | Blog Page → Product Page → Checkout | 2% |
| 98099d59f → B4297c574 | FAQ Page → Checkout | 0.3% |

The above table can be constructed from observing traffic over time. The above data can be aggregated into a summary table of navigation patterns, such as the following:

| Navigation Patterns | % of traffic |
|---|---|
| Home Page → [1-5] Product Pages → Checkout | 65% |
| Home Page → [6-10] Product Pages → Login → Checkout | 20% |
| ... more rows ... | ... more rows ... |
| ... more rows ... | ... more rows ... |
| ... more rows ... | ... more rows ... |
| Non Product Pages → Login → Checkout | 1% |
| Product Pages → Login → Non Product Pages | 0.3% |

Figure 13:
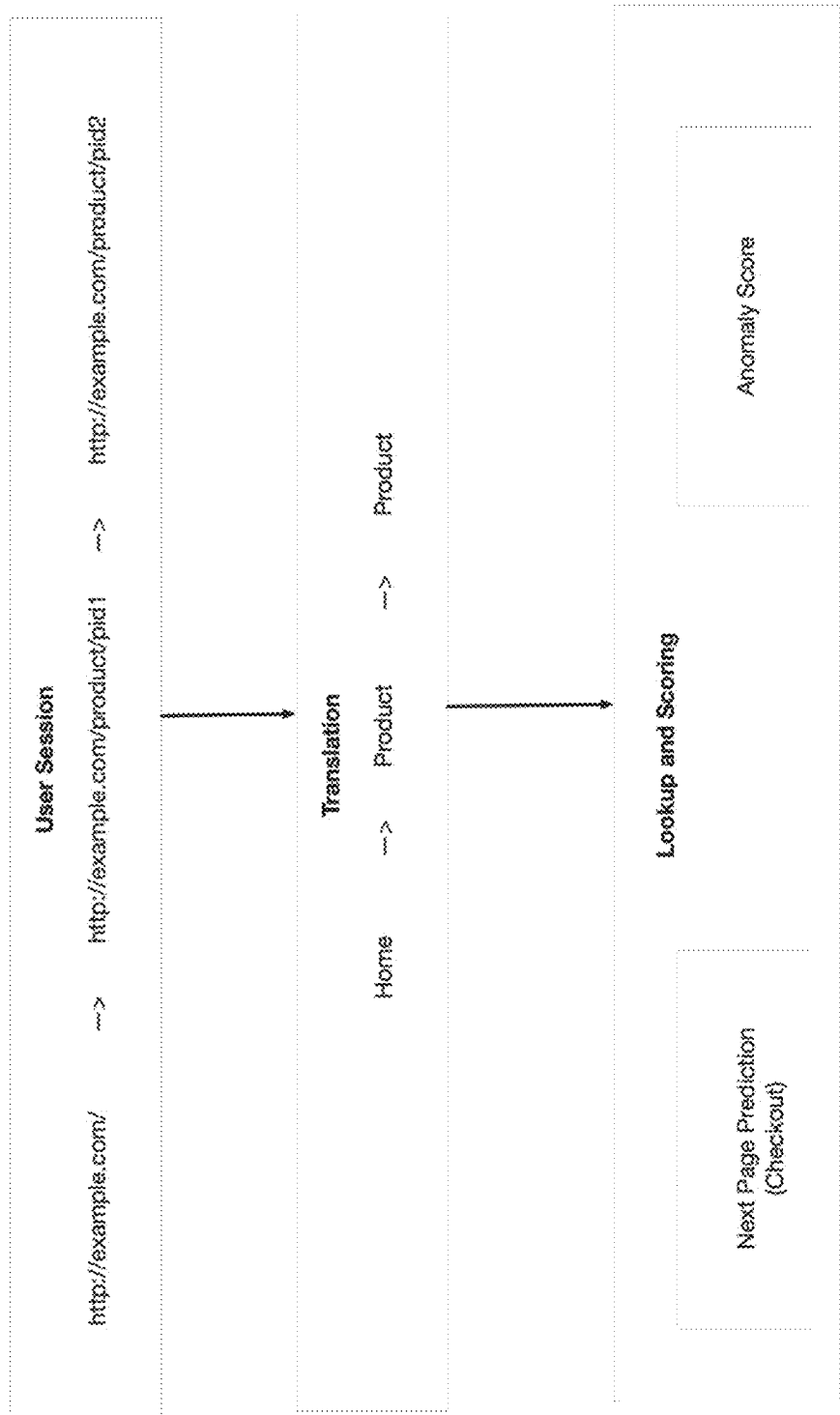
FIG. 13 is a diagram of a method for anomaly scoring and next page prediction of an ongoing user activity session on a web page, in accordance with an embodiment of the teachings hereof; and, FIG. 14 is a block diagram illustrating hardware in a computer system that may be used to implement the teachings hereof.

FIG. 13 illustrates an example of method for anomaly scoring and next page prediction of an ongoing user activity session on a web page. As the user moves across web pages, the system tracks the associated web page categories, as shown in the second box. This navigation can be input into the developed heuristics to see how similar this is to established patterns. The next page prediction can be made, e.g. as a checkout page, and if the client is not observed to do this, then it may affect the anomaly score. Regardless, an anomaly score can be produced and if this score exceeds a configured threshold then the client is flagged as a bot.

As those skilled in the art will appreciate, the navigation patterns (with web page category labels) can be used to train a machine learning algorithm to detect anomalies (e.g., unsupervised learning) or to classify the user as a bot or not (e.g., supervised/labeled).

Bot Detection: Page Abuse

In this approach, bot detection is determined due to a certain category of web page on a site are visited beyond their typical or expected use (as indicated by, e.g., some configurable threshold beyond average or baseline). The table below can be developed form traffic statistics observed over time:

| Page Category | % of traffic |
|---|---|
| Product Details | 35% |
| Home | 25% |

| Page Category | % of traffic |
|---|---|
| Product List View | 20% |
| Search | 18% |
| ... more rows ... | ... more rows ... |
| ... more rows ... | ... more rows ... |
| Help Pages | 0.5% |
| Error Pages (4xx, 5xx) | 0.1% |

As can be seen from the table, the web page categorization helps simplify and yet enhance the page statistics. In a current session, the bot detection engine can gather telemetry and can detect such increased telemetry collection on a certain category of pages and flag the sessions for suspicious activity.

In a related technique, the user activity on a specific category of pages can be used to validate a given user as a human. That is, the web page categorization can be used to adjust and tune the bot detection engine's tolerance thresholds for a given user session, so as to reduce false positives.

Bot Detection: Challenge Page Navigation and False Positive Recoverability

In this approach, user sessions can be behaviorally analyzed based on post-challenge behavior. For example, heuristics can be developed based on the following insights. In the table below, FP stands for "false positive" while FN stands for "false negative".

| Navigation Patterns with Challenge pages | Behavioral Metrics |
|---|---|
| Non transactional Pages → CAPTCHA → Transaction Pages | FP recovered or Potential FN |
| Non transactional Pages → CAPTCHA | Potential False Positives or True Positives |
| Non transactional Pages → CAPTCHA → Non Transactional Pages | Users stuck in potential non-recoverable FP loop |

Bot Detection: Behavioral Analysis

This approach leverages the insight that Human users tend to repeat similar behavior on a given category of pages. We are talking about a specific user in a specific session when navigating a set of pages. Consistent user behavior across similar pages is a strong sign of human behavior. Fixed or robotic behavior of bots can be spotted as well.

| Single Session | Category | Telemetry - Behavior | Behavioral Score with similar category of pages |
|---|---|---|---|
| http://example.com/product/page 1 | Product | { "no_of_clicks": 4, "scroll_depth": 200, "mouse_moves": 170, "touch_events": 0, "time_spent": 15, "Session_heat_map": [ . . . ], . . . } | NA |
| http://example.com/product/page 2 | Product | { "no_of_clicks": 2, "scroll_depth": 210, "mouse_moves": 170, "touch_events": 0, "time_spent": 20, "Session_heat_map": [ . . . ], . . . } | 95% |
| http://example.com/product/page 3 | Product | { "no_of_clicks": 2, "scroll_depth": 300, "mouse_moves": 150, "touch_events": 0, "time_spent": 10, "Session_heat_map": [ . . . ], . . . } | 98% |
| . . . more rows . . . | . . . more rows . . . | . . . more rows . . . | . . . more rows . . . |

As those skilled in the art will appreciate, any of the foregoing techniques can be combined with others. Further, they will appreciate that the insights from behavior using the fingerprinting and web page categorization approaches herein can be implemented in a variety of ways in a bot detection engine. The implementation can be based on heuristics and associated rulesets applied at the edge, and/or inference performed by trained machine learning models that detect anomalies (e.g., unsupervised learning) or to classify the user as a bot or not (e.g., supervised/labeled). The teachings hereof are not limited to and do not turn on the use of any special machine learning techniques; state of the art machine learning is sufficient.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 14:
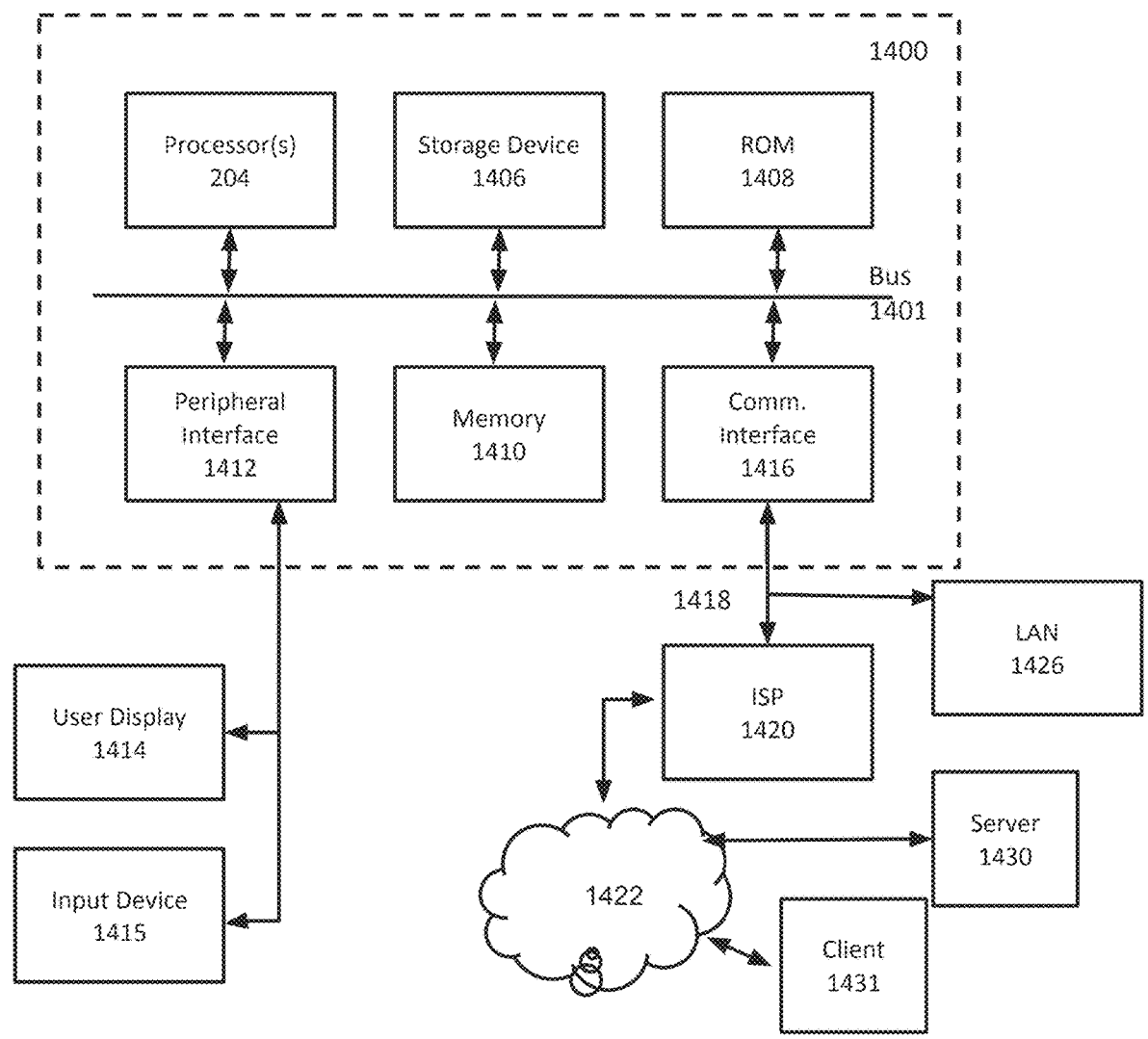

FIG. 14 is a block diagram that illustrates hardware in a computer system 1400 upon which such software may run in order to implement embodiments of the invention. The computer system 1400 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 1400 includes a microprocessor 1404 coupled to bus 1401. In some systems, multiple processor and/or processor cores may be employed. Computer system 1400 further includes a main memory 1410, such as a random access memory (RAM) or other storage device, coupled to the bus 1401 for storing information and instructions to be executed by processor 1404. A read only memory (ROM) 1408 is coupled to the bus 1401 for storing information and instructions for processor 1404. A non-volatile storage device 1406, such as a magnetic disk, solid state memory (e.g., flash memory), or optical disk, is provided and coupled to bus 1401 for storing information and instructions. Other application-specific integrated circuits (ASICs), field programmable gate arrays (FPGAs) or circuitry may be included in the computer system 1400 to perform functions described herein.

A peripheral interface 1412 may be provided to communicatively couple computer system 1400 to a user display 1414 that displays the output of software executing on the computer system, and an input device 1415 (e.g., a keyboard, mouse, trackpad, touchscreen) that communicates user input and instructions to the computer system 1400. However, in many embodiments, a computer system 1400 may not have a user interface beyond a network port, e.g., in the case of a server in a rack. The peripheral interface 1412 may include interface circuitry, control and/or level-shifting logic for local buses such as RS-485, Universal Serial Bus (USB), IEEE 1394, or other communication links.

Computer system 1400 is coupled to a communication interface 1416 that provides a link (e.g., at a physical layer, data link layer,) between the system bus 1401 and an external communication link. The communication interface 1416 provides a network link 1418. The communication interface 1416 may represent an Ethernet or other network interface card (NIC), a wireless interface, modem, an optical interface, or other kind of input/output interface.

Network link 1418 provides data communication through one or more networks to other devices. Such devices include other computer systems that are part of a local area network (LAN) 1426. Furthermore, the network link 1418 provides a link, via an internet service provider (ISP) 1420, to the Internet 1422. In turn, the Internet 1422 may provide a link to other computing systems such as a remote server 1430 and/or a remote client 1431. Network link 1418 and such networks may transmit data using packet-switched, circuit-switched, or other data-transmission approaches.

In operation, the computer system 1400 may implement the functionality described herein as a result of the processor executing code. Such code may be read from or stored on a non-transitory computer-readable medium, such as memory 1410, ROM 1408, or storage device 1406. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 1418 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A method for detecting bots, comprising:
   A. asynchronous to a request from a client, automatically assigning each of a plurality of URLs to one of a plurality of web page categories, where the automatic assignment for a given one or the plurality of URLs is based on a fingerprint computed from a markup language file associated with the given one of the plurality of URLs; and,
   B. responsive to intercepting the request from the client:
      determining a request URL, to which the request is directed;
      determining the assigned web page category for the request URL by comparison to the results of the automatic assignment process set forth in A;
      sending, with other data related to the request, the assigned web page category to a bot detection service;
      receiving from the bot detection service an indication as to whether the client is a bot; and,
      based on the indication, forwarding the request from the client for handling.

2. The method of claim 1, where said automatic assignment comprises, for a given URL of the plurality of URLs:
   processing a markup language file associated with the given URL to create an associated DOM tree;
   computing a fingerprint for the given URL from at least a portion of the associated DOM tree; and,
   assigning the given URL to one of the plurality of web page categories based on the fingerprint for the given URL.

3. The method of claim 2, wherein computing the fingerprint for the given URL from at least a portion of the associated DOM tree comprises at least one of:
   (i) filtering content from the associated DOM tree such that the fingerprint is computed from structure of the associated DOM tree, and,
   (ii) applying a hash function to code forming at least a portion of the associated DOM tree.

4. The method of claim 1, wherein determining the assigned web page category for the request URL comprises at least one of:
   (i) processing a markup language file associated with the request URL to create an associated DOM tree, and computing a fingerprint for the request URL from at least a portion of the associated DOM tree, and,
   (ii) looking up the request URL in a table to find the assigned web page category.

5. The method of claim 1, wherein the other data related to the request comprises any of:
   (i) sensor data reflecting one or more interactions at the client, and
   (ii) a cookie value received from the client.

6. The method of claim 1, further comprising, with the bot detection service, one or more of the following:
   (i) applying a set of rules that identify differences between human and bot behavior when visiting web pages in the assigned web page category, and,
   (ii) applying, in an inferencing step, a machine learning model trained with data reflecting interactions on web pages in web page categories, so as to differentiate a human from a bot.

7. The method of claim 1, further comprising, with the bot detection service, one or more of the following:
   (i) applying a set of rules that identify differences between humans and bot behavior in navigating across web pages different web page categories, and,
   (ii) applying, in an inferencing step, a machine learning model trained with data reflecting navigation on web pages across web page categories, so as to differentiate a human from a bot.

8. The method of claim 1, further comprising, with the bot detection service, applying, in an inferencing step, a machine learning model trained to differentiate a human from a bot.

9. The method of claim 1, wherein the handling comprises any of alerting or blocking the request.

10. A system having one or more computers, each with circuitry forming at least one processor and memory storing computer program instructions for execution on the at least one processor to operate the respective computer, the one or more computers collectively operable to:
   A. asynchronous to a request from a client, automatically assign each of a plurality of URLs to one of a plurality of web page categories, where the automatic assignment for a given one or the plurality of URLs is based on a fingerprint computed from a markup language file associated with the given one of the plurality of URLs; and,
   B. responsive to intercepting the request from the client:
      determine a request URL, to which the request is directed;
      determine the assigned web page category for the request URL by comparison to the results of the automatic assignment process set forth in A;
      send, with other data related to the request, the assigned web page category to a bot detection service;
      receive from the bot detection service an indication as to whether the client is a bot; and,
      based on the indication, forward the request from the client for handling.

11. The system of claim 10, where said automatic assignment comprises, for a given URL of the plurality of URLs:
   processing a markup language file associated with the given URL to create an associated DOM tree;
   computing a fingerprint for the given URL from at least a portion of the associated DOM tree; and,
   assigning the given URL to one of the plurality of web page categories based on the fingerprint for the given URL.

12. The system of claim 11, wherein computing the fingerprint for the given URL from at least a portion of the associated DOM tree comprises at least one of:
   (i) filtering content from the associated DOM tree such that the fingerprint is computed from structure of the associated DOM tree, and,
   (ii) applying a hash function to code forming at least a portion of the associated DOM tree.

13. The system of claim 10, wherein determining the assigned web page category for the request URL comprises at least one of:
   (i) processing a markup language file associated with the request URL to create an associated DOM tree, and computing a fingerprint for the request URL from at least a portion of the associated DOM tree, and,
   (ii) looking up the request URL in a table to find the assigned web page category.

14. The system of claim 10, wherein the other data related to the request comprises any of:
   (i) sensor data reflecting one or more interactions at the client, and
   (ii) a cookie value received from the client.

15. The system of claim 10, the bot detection service operable to perform one or more of the following:
   (i) applying a set of rules that identify differences between human and bot behavior when visiting web pages in the assigned web page category, and,
   (ii) applying, in an inferencing step, a machine learning model trained with data reflecting interactions on web pages in web page categories, so as to differentiate a human from a bot.

16. The system of claim 10, further comprising, with the bot detection service, one or more of the following:
   (i) applying a set of rules that identify differences between humans and bot behavior in navigating across web pages different web page categories, and,
   (ii) applying, in an inferencing step, a machine learning model trained with data reflecting navigation on web pages across web page categories, so as to differentiate a human from a bot.

17. The system of claim 10, the bot detection service operable to apply, in an inferencing step, a machine learning model trained to differentiate a human from a bot.

18. The system of claim 10, wherein the handling comprises any of alerting or blocking the request.

19. A non-transitory computer readable medium storing computer program instructions for execution on one or more hardware processors of one or more computers to cause the one or more computers collectively to:
   A. asynchronous to a request from a client, automatically assigning each of a plurality of URLs to one of a plurality of web page categories, where the automatic assignment for a given one or the plurality of URLs is based on a fingerprint computed from a markup language file associated with the given one of the plurality of URLs; and,
   B. responsive to intercepting the request from the client:
      determining a request URL, to which the request is directed;
      determining the assigned web page category for the request URL by comparison to the results of the automatic assignment process set forth in A;
      sending, with other data related to the request, the assigned web page category to a bot detection service;
      receiving from the bot detection service an indication as to whether the client is a bot; and,
      based on the indication, forwarding the request from the client for handling.

\* \* \* \* \*